United States Patent Office 3,225,930
Patented Dec. 28, 1965

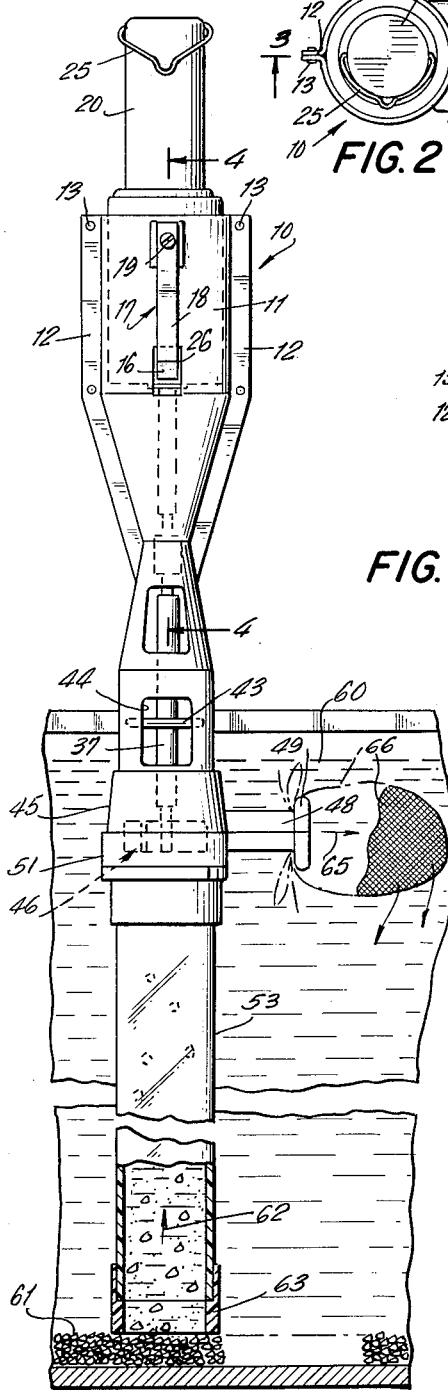

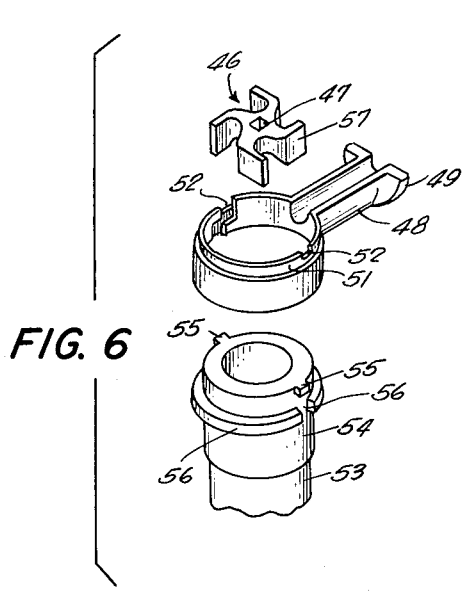
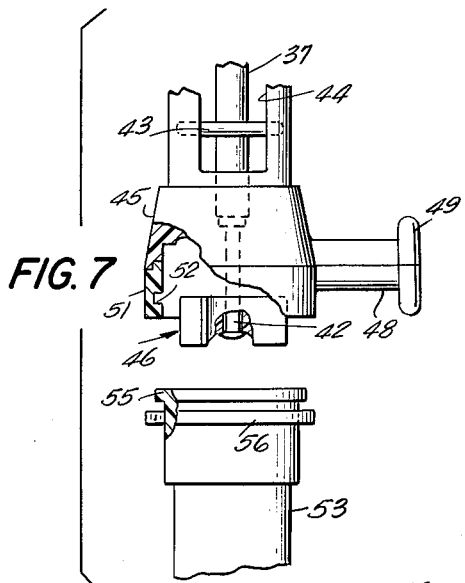
FIG. 6
FIG. 7
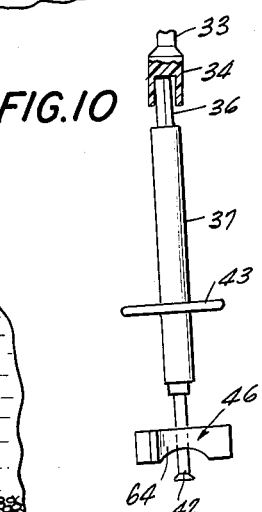
FIG. 9
FIG. 10
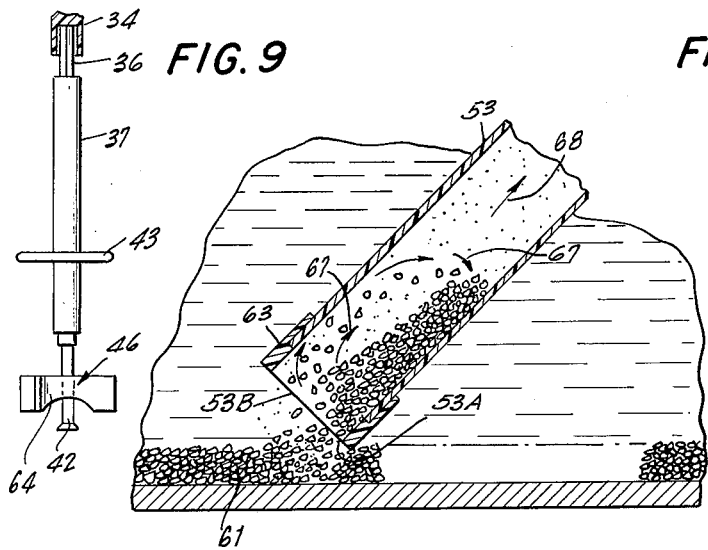
FIG. 8
INVENTOR.
ALLAN H. WILLINGER
BY
Friedman + Goodman
ATTORNEYS

3,225,930
AQUARIUM CLEANING DEVICE
Allan H. Willinger, New Rochelle, N.Y., assignor to Aquariums Incorporated, Maywood, N.J., a corporation of Delaware
Filed Oct. 9, 1963, Ser. No. 315,088
4 Claims. (Cl. 210—241)

The present application is a continuation-in-part of my prior application Serial No. 137,276, filed September 11, 1961.

The present invention relates in general to a device for cleaning aquarium tanks and in particular to such a device which is employed for the cleaning of gravel and other substances which are commonly found in aquarium tanks.

In my prior application there is illustrated and described a highly useful and efficient aquarium cleaning device. It is an object of the present invention to provide a vacuum cleaning aquarium device of the type described in my prior application which is provided with various improvements which further increase the utility and efficiency thereof.

In accordance with the foregoing objective of the present invention, it is another object to provide shaft coupling means between the motor and the rotor of the cleaning device.

It is another object of the present invention to provide a device of the described type having provision whereby additional torque may be applied to the rotor of the device if required.

It is another object of the present invention to provide a device of the described type wherein the corrosion of the operating switch by the water in the tank may be eliminated or substantially reduced.

It is a still further object of the present invention to provide a generally improved device of the character described which will have a relatively long, efficient and useful life and which can be manufactured and sold at a relatively low cost.

Other and further objects and advantages of the present invention will become readily apparent to one skilled in the art from a consideration of the following specification taken in connection with the appended drawings.

In the drawings which illustrate the best mode presently contemplated for carrying out the invention:

FIGURE 1 is a side elevational vew of one embodiment of the present invention which is illustrated in operative position wherein it is employed for cleansing the gravel bed of an aquarium tank;

FIGURE 2 is a top plan view of the form of the invention illustrated in FIGURE 1;

FIGURE 3 is a vertical cross-sectional view taken on line 3—3 of FIGURE 2;

FIGURE 4 is a fragmentary sectional view on an enlarged scale taken on the line 4—4 of FIGURE 1;

FIGURE 5 is a fragmentary sectional view taken on the line 5—5 of FIGURE 4;

FIGURE 6 is an exploded perspective view of a portion of the device in which the impeller is housed;

FIGURE 7 is an exploded elevation view of the impeller housing and dip tube, with parts being broken away for purposes of illustration;

FIGURE 8 is a fragmentary view and illustrates the lower end of the dip tube of the present invention in another position thereof for providing a highly novel type of cleaning action;

FIGURE 9 is a view illustrating the coupling between the motor shaft and the rotor shaft; and FIGURE 10 is a view similar to FIGURE 9 showing the parts in another operative position thereof.

As illustrated in the foregoing drawings, the present invention comprises a lightweight battery driven motor which is mounted to drive a rotor or impeller adapted to create a flow of water from within an aquarium tank through a tubular member and a filtering means associated therewith. The described embodiment of the invention is substantially in the form of a longitudinal member which is readily graspable at its upper end for manipulation in contact with the various portions of the gravel bed of an aquarium tank as well as with other desired portions thereof.

As best seen in FIGURES 1 and 3 of the drawings, the present invention comprises a split housing which is generally designated by the numeral 10 and which includes a pair of tubular members 11 united by oppositely disposed flanges 12 which are secured in closed position as by the rivets 13. The housing 10 receives a motor 14 which is mounted within a metallic casing 15. The casing 15 is provided with an extension or finger 16 which comprises one element of a two-part switch generally designated by the numeral 17. The other element of the switch 17 is constituted by a manually operable contact bar 18. Contact bar 18 is a resilient or spring member and is secured to the motor casing 15 by means of a metallic screw 19 which passes through the split housing 10 into which it is threaded as best shown in FIGURE 4. A cylindrical metallic casing or housing 20 for a dry cell battery 21 is releasably threadedly secured to the motor casing 15 as at 22. It will be understood that the battery casing 20 may be large enough to accommodate the number of batteries 21 which may be required for the operation of the cleaning device of the present invention. As here shown, the battery casing 20 accommodates a single battery 21; however, it will be readily apparent that the battery casing may be large enough to accommodate a greater number of batteries. It will be understood that the metallic battery casing 20 is provided with the conventional metallic conical battery spring not illustrated whereby electrical contact is made between the negative end of the battery and the metallic casing 20. The positive terminal 23 of the battery is connected to one terminal of the motor 14 the other terminal of which is connected in conventional fashion to the spring contact finger 16. In order to energize the motor 14 the spring contact 18 of the switch 17 is depressed as indicated by the arrow 24 so as to move from the full line position thereof wherein the contact 18 is spaced from the contact 16 to the broken line position thereof wherein both of said contacts are in abutment so as to complete the electrical energizing circuit for the motor 14 so as to energize the latter. It will be understood that each time that the switch contact element 18 is depressed, the free end thereof wipes against the companion stationary contact 16 so as to remove any dirt or corrosion formed on the latter. In this way, despite the fact that the cleaning device of the present invention is used in connection with aquarium water which may have a corrosive action upon the switch contact if water should inadvertently splash thereon, the successive operation of the contact 18 and the resultant wiping action thereof will cause the corroded parts of the switch contact elements which are subjected to the corrosive action of the water to be cleansed of the corrosive effects as well as cleansed of any foreign particles which may adhere thereto.

The previously mentioned screw 19 which secures the switch element 18 to the split housing 10 extends through the latter and into the motor casing 15 and thereby dually secures the motor in position within the split housing and also provides electrical continuity, as previously described. A handle 25 is pivotly mounted at the upper end of the battery casing 20. Battery casing 20 and battery 21 are arranged in tandem with the encased motor 14. The switch operating element 18 at the lower end thereof extends into an aperture 26 provided in the split housing 10 for making contact with the contact finger 16 as previously described. For this purpose the motor casing 15 is cut away as at 27 to expose the stationary contact 16. The housing 10 has a narrowed or tapered throat 28 which is provided with a diaphragm 29 having a central aperture 30. Motor 14 is provided with a hollow shaft 31 which is split as at 32 so that a flexible shaft fitting 33 may be inserted into the shaft 31. The shaft fitting 33 is provided with an enlarged hollow head 34, the head being positioned and free to rotate within the diaphragm aperture 30. Provision is made for a rotor 35 having a reduced upper end 36 which is frictionally releasably received within the hollow head 34 provided on the shaft fitting 33. Due to the frictional coupling between the rotor 35 and the shaft fitting 33 which is provided in the motor shaft 31 it will be apparent that rotation of the shaft 31 causes rotation of the shaft 37 of the rotor 35. The rotor shaft 37 extends through outwardly flared portion 38 of the split housing 10 and at its lower end projects into a pump casing generally designated by the reference numeral 39 and provided at the lower end of the housing 10. The casing 39 is provided with an upper wall 40 which is centrally apertured as at 41. The rotor shaft 37 is provided with a lower extension 42 which is journalled in the aperture 41. The rotor shaft 37 is provided with a wheel 43 which is accessible through apertures 44 provided in the housing 10 for a purpose which is hereinafter described in detail.

The pump casing 39 is provided with a skirt 45 which extends above the upper wall 40 thereof so as to receive the lower end of the housing 10 as best shown in FIGURE 3, the housing being suitably secured within the pump casing as by being cemented thereto. A rotatable rotor head or impeller 46 is mounted for rotation within the pump casing 39. More specifically, the rotor head 46 as best shown in FIGURE 6 is provided with a rectangular central aperture 47 which is adapted to frictionally releasably receive the complementary shaped rotor extension 42 at the lower end of the rotor shaft 37. The pump casing 39 is provided also with a radially disposed tubular outlet 48 which is provided with an annular flange 49 which surrounds the outlet end 50 thereof. Below the outlet 48, the pump casing 39 is provided with an annular skirt 51 having bayonet slots 52 provided on the inner surface thereof. A dip tube 53 is releasably secured to the pump casing 39 below the tubular outlet 48 thereof. More specifically, the dip tube 53 is provided at the upper end thereof with a tubular fitting 54. The fitting 54 is provided with opposing bayonet slot connector elements 55 at the upper end thereof and with an interrupted annular flange 56 below said elements. The fitting 54 is releasably secured to the pump casing 39 by engagement of the bayonet connector elements 55 in the bayonet slots 52 to provide a bayonet slot connection. When the fitting 54 is so engaged with the pump casing 39 the flange 56 of the fitting will abut the adjacent marginal edge of the pump casing 39 as best shown in FIGURE 2. Due to the described bayonet slot connection, the dip tube and the fitting thereon are removable as a unit from the pump casing 39.

The rotor head 46 is disposed adjacent to the tubular outlet 48 and the rotor head is provided with a plurality of vanes 57 which emanate from the central portion thereof. It will be noted that the longitudinal axis of each of said vanes 57 is offset with respect to the center of the rotor head 46.

From the foregoing, it will be apparent that the rotor head 46 is readily removable from the lower end of the rotor 35 and that the latter is readily removable from the shaft fitting 33 which is frictionally secured to the motor shaft 31. More specifically, it will be noted from FIGURE 5 that the upper shaft extension 36 on the rotor shaft 37 has a square or rectangular cross section. The hollow head 34 on the shaft fitting 33 is provided with a rectangular recess 58. The shaft extension 36 is disposed in offset relation in the recess 58 in coupling head 34, as best shown in FIGURE 5 to provide a flexible coupling between rotor shaft 37 and motor shaft 31. More specifically, the shaft extension 36 can tilt from the position thereof shown in FIGURE 9, wherein impeller 46 is vertically aligned with the coupling head, to the position thereof shown in FIGURE 10 wherein the impeller is relatively far from vertical alignment with the coupling head. Nevertheless, even in the coupling condition illustrated in FIGURE 10, the flexible coupling between the motor and rotor shafts will function with the limited torque of the relatively small motor 14, which, for example, and not by way of limitation, may be a 1½ to 3 volt motor.

When the motor is energized by means of the switch 17, the rotor head 46 is caused to rotate. When the dip tube 53 is inserted below the level of the water 60 in an aquarium tank so as to be in the vicinity of a gravel bed 61 contained therein, the rotation of the rotor head 46 will exert a suction upon the water and upon the gravel bed. The suction exerted by the rotation of the rotor head 46 will agitate the gravel so as to raise a number of particles of such gravel into the lower portion of the dip tube 53, thereby exposing to the flow of water within said tube the various faces of the pieces of said gravel. In this way, dirt and foreign particles which have accumulated upon said gravel will be exposed to said flow of water and will be drawn upwardly in the direction of the arrow 62 shown in FIGURE 1 of the drawings. If desired, a sleeve 63 may be provided at the lower end of the dip tube for attaching longer lengths of tubing for deeper tanks.

As best shown in FIGURE 3, the rotor head 46 is provided with a centrally disposed hub 64, and the height of the vanes 57 is greater than that of the hub. Moreover, the leading surfaces of the vanes 57 are of a convex conformation. As a result of these characteristics of the rotor head, the latter is quite effective to create a suction upon the water within the dip tube 53 thereby drawing such water and any contaminants contained therein into the pump casing 39 from which point they are discharged by the rotor head through the outlet 48 as shown by arrow 65. A removable cloth filter bag 66 may be advantageously attached to the peripheral flange 49 provided upon said outlet 48 whereby foreign particles contained in the water drawn through the outlet may be accumulated in the filter bag. When the filter bag has been filled with foreign particles and contaminants, its contents may be discharged as desired, or the entire filter bag may be disposed of and replaced by a similar bag. It will be noted in connection with the foregoing that due to their greater weight, the various gravel particles will not be raised to any substantial extent within the dip tube 53 but will be merely agitated at its lower end thereof. As a result, the cleaning operation effected by the present invention will not result in a decrease of the gravel within the aquarium tank. Other objects such as shells or ornamental items disposed within the tank, as well as plant life contained therein, may also be exposed to the suction action of the device of the present invention with a resultant cleaning of foreign particles and contaminants which may be located thereon. The impeller 46 is spaced, as at 69, from the overlying wall of housing 39, sufficiently to prevent any gravel or large pieces of waste matter from interfering with the impeller, said spacing being large enough to pass gravel and large pieces of waste matter. However in the event that a light piece of detritus, or a pebble should be drawn into the casing and lodged therein so as to interfere with the operation of the rotor head 46 and possibly to stop the latter, the previously described wheel 43 may be spun with the fingers so as to provide additional torque to dislodge the detritus from its interfering position and permit the cleaning device of the present invention to operate in its normal efficient manner.

In practice, it has been found that a more efficient cleaning operation within the gravel bed 61 may be accomplished if the dip tube 53 is tilted in the manner illustrated in FIGURE 8 rather than being maintained in the erect position thereof shown in FIGURE 1. With the tube in the tilted position, it has been found that gravel particles which are drawn into the dip tube will tend to travel in a generally circular path as indicated by the arrows 67 rather than move upward directly into the dip tube as indicated by the arrow 62 in FIGURE 1. The resultant circular churning motion of the gravel particles will reduce the time required to clean the gravel particles and will also provide a superior cleaning action. The churning motion probably results from the fact that the lower end of the dip tube is not equally spaced at all points thereof from the gravel bed, the dip tube being in contact with the gravel bed as at 53A and being spaced from the gravel bed as at 53B. As a result more water is drawn into the dip tube adjacent the end 53B thereof than is drawn into the dip tube adjacent the end 53 thereof. The resultant uneven or unequal water pressures which are developed within the lower end of the dip tube cause the circular churning action of the gravel elements drawn into the dip tube which results in a superior cleaning action. This results in a continuous flow of waste matter, which is separated from the continuously churning particles, the waste matter moving up the tube as indicated by arrow 68. This churning movement of the gravel elements greatly reduces the possibility that a pebble will reach the impeller.

The dip tube 53, the housing 10, the pump casing 39 and the rotor 35 are preferably constructed or molded of a suitable plastic material which is resistant to adverse effects which might otherwise arise from the water of the aquarium tank. If desired, the plastic material, and especially that of which the dip tube is fabricated, may be transparent to permit observation of the operation of said members thereby providing a visual check upon their operability and efficiency.

It will be apparent from the foregoing, that the present invention provides a lightweight easily manipulable means for cleaning any desired portion of an aquarium tank, that its observation is easily observable and inherently efficient and that it is readily assemblable and disassemblable as may be desired.

While I have illustrated and described the presently preferred embodiment of my invention, it will be understood that various changes and modifications can be made therein without however departing from the inventive concept thereof, as set forth in the appended claims.

I claim:

1. A portable aquarium cleaning device comprising an elongated housing, a centrifugal pump disposed in a casing at one end of said housing and means for continuously driving said pump including motor means at the other end thereof, means for energizing said motor interconnected therewith, said centrifugal pump being drivably connected with said motor, said centrifugal pump casing being provided with an axially disposed inlet opening and a radially extending outlet, elongated tube means depending from said casing, one end of said tube being in communication with said inlet opening, the other end of said tube being open, a filter secured to said outlet, the operation of said pump by said motor causing water to be continuously drawn from an aquarium tank through said tube and pump casing and recirculated into the tank in filtered form after passage through said outlet and filter, whereby upon operation of said pump, water may be continuously drawn from an aquarium tank through said tube and pump and recirculated into said tank in filtered form after passage through said outlet and filter receptacle, the circulation of water through said tube when the open end thereof is disposed adjacent to aquarium gravel causing said gravel to be continuously elevated and agitated in the lower end of said tube, thereby subjecting said gravel to a continuous cleaning action and causing an initial separation of said gravel from the lighter particles of waste material interspersed therewith.

2. A portable aquarium cleaning device comprising an elongated housing, a centrifugal pump disposed in a casing at one end of said housing and battery operated motor means at the other end thereof, electrical battery means for energizing said motor interconnected therewith, support means for said battery means, said centrifugal pump being drivably connected with said motor, said centrifugal pump casing being provided with an axially disposed inlet opening and a radially extending outlet, elongated tube means depending from said casing, one end of said tube being in communication with said inlet opening, the other end of said tube being open, a filter secured to said outlet, the operation of said pump by said motor causing water to be continuously drawn from an aquarium tank through said tube and pump casing and recirculated into the tank in filtered form after passage through said outlet and filter, said tube, pump casing, and battery support means being disposed in axial alignment with each other, whereby upon operation of said pump, water may be continuously drawn from an aquarium tank through said tube and pump and recirculated into said tank in filtered form after passage through said outlet and filter receptacle, the circulation of water through said tube when the open end thereof is disposed adjacent to aquarium gravel causing said gravel to be continuously elevated and agitated in the lower end of said tube, thereby subjecting said gravel to a continuous cleaning action and causing an initial separation of said gravel from the lighter particles of waste material interspersed therewith.

3. A portable aquarium cleaning device comprising an elongated housing, a centrifugal pump disposed in a casing at one end of said housing and means for continuously driving said pump including motor means at the other end thereof, electrical battery means for energizing said motor interconnected therewith, said centrifugal pump being drivably connected with said motor, said centrifugal pump casing being provided with an axially disposed inlet opening and a radially extending outlet, elongated tube means depending from said casing, one end of said tube being in communication with said inlet opening, the other end of said tube being open, a filter secured to said outlet, the operation of said pump by said motor causing water to be continuously drawn from an aquarium tank through said tube and pump casing and recirculated into the tank in filtered form after passage through said outlet and filter, support means mounting said battery and motor means on said housing, said support means comprising a handle for said device, whereby the device may be grasped in one hand of the user and manipulated in contact with various portions of the gravel bed of an aquarium tank, whereby upon operation of said pump, water may be continuously drawn from an aquarium tank through said tube and pump and recirculated into said tank in filtered form after passage through said outlet and filter receptacle, the circulation of water through said tube when the open end thereof is disposed adjacent to aquarium gravel causing said gravel to be continuously elevated and agitated in the lower end of said tube, thereby subjecting said gravel to a continuous cleaning action and causing an initial separation of said gravel from the lighter particles of waste material interspersed therewith.

4. A portable aquarium cleaning device comprising an elongated housing, a centrifugal pump disposed in a casing at one end of said housing and means for continuously driving said pump including motor means at the other end thereof, means for energizing said motor interconnected therewith, said centrifugal pump being drivably connected with said motor, said centrifugal pump casing being provided with an axially disposed inlet opening and a radially extending outlet, elongated tube means depending from said casing, one end of said tube being in communication with said inlet opening, the other end of said tube being open, a filter secured to said outlet, the operation of said pump by said motor causing water to be continuously drawn from an aquarium tank through said tube and pump casing and recirculated into the tank in filtered form after passage through said outlet and filter, said outlet comprising a relatively short rigid tubular member extending from said casing and comprising means for removably supporting a disposable filter receptacle, whereby upon operation of said pump, water may be continuously drawn from an aquarium tank through said tube and pump and recirculated into said tank in filtered form after passage through said outlet and filter receptacle, the circulation of water through said tube when the open end thereof is disposed adjacent to aquarium gravel causing said gravel to be continuously elevated and agitated in the lower end of said tube, thereby subjecting said gravel to a continuous cleaning action and causing an initial separation of said gravel from the lighter particles of waste material interspersed therewith.

References Cited by the Examiner

UNITED STATES PATENTS

| | | | |
|---|---|---|---|
| 1,108,053 | 8/1914 | Wiwi et al. | 230—259 X |
| 1,357,261 | 11/1920 | Svoboda | 230—259 |
| 2,590,581 | 3/1952 | Shirley | 210—169 X |
| 2,908,150 | 10/1959 | Stern | 64—11 |
| 2,956,507 | 10/1960 | Hutchinson. | |
| 3,056,911 | 10/1962 | Hart et al. | 103—25 X |

FOREIGN PATENTS

| | | |
|---|---|---|
| 66,384 | 3/1948 | Denmark. |
| 795,117 | 5/1958 | Great Britain. |

REUBEN FRIEDMAN, *Primary Examiner.*